Patented Nov. 17, 1925.

1,561,985

UNITED STATES PATENT OFFICE.

HANS KLENCKE, OF FRANKFORT-ON-THE-MAIN, GERMANY, ASSIGNOR TO AMERICAN LURGI CORPORATION, OF NEW YORK, N. Y., A CORPORATION.

PROCESS FOR THE PRODUCTION OF SULPHURIC ACID.

No Drawing. Application filed March 28, 1924. Serial No. 702,690.

*To all whom it may concern:*

Be it known that I, HANS KLENCKE, a citizen of the German Republic, residing at Frankfort-on-the-Main, Schwanthalerstrasse 72, Germany, have invented certain new and useful Improvements in Processes for the Production of Sulphuric Acid, of which the following is a specification.

The processes for the production of sulphuric acid protected by Letters Patent Nos. 1,399,526 and 1,512,863, have opened up the possibility of economically utilizing cold gases, having a low or varying $SO_2$ content inasmuch as by means of said processes, the intensity and velocity of the $SO_2$ oxidation has been increased to a surprising extent. However, there are industrial gases with such a low $SO_2$ content that the acceleration of the reaction which has hitherto been attained, is not yet sufficient for economically working with such gases.

The present invention is based on the recognition that the $SO^2$ oxidation can be further accelerated by bringing the gases into contact with a large amount of nitrosyl sulphuric acid of the highest possible concentration with respect to nitrogen-oxygen compounds but of comparatively low specific gravity, in the neighborhood of 58° Bé., and then treating the resulting gas mixture with nitrosyl sulphuric acid of high concentration with respect to nitrogen-oxygen compounds and of high specific gravity. The dilute cold gases expel the nitrogen-oxygen compounds from the first nitrosyl sulphuric acid with comparative ease and when the resulting gas mixture is treated with the second nitrosyl sulphuric acid the $SO_2$ oxidation which would otherwise proceed slowly is completed exceedingly quickly. For the progress of the reaction it is advantageous if the second nitrosyl sulphuric acid approaches a specific gravity corresponding to 66° Bé. and if its nitrogen-oxygen compounds content approaches the highest concentration attainable.

The process of the present invention is not restricted to the use of any particular apparatus although the apparatus and devices described in the Letters Patent Nos. 1,399,526 and 1,512,863, are particularly suitable. Moreover, the process is also adapted to be used in connection with gases having a higher $SO_2$ content.

What I claim is:

Process for the production of sulphuric acid which comprises bringing $SO_2$-containing gases into contact with nitrosyl sulphuric acid of a specific gravity in the neighborhood of 58° Bé. and of the highest possible concentration with respect to nitrogen-oxygen compounds and then bringing the resulting gas mixture into contact with nitrosyl sulphuric acid of a specific gravity approaching 66° Bé. and approaching the highest nitrogen-oxygen compounds concentration attainable.

In testimony whereof I affix my signature.

HANS KLENCKE.